(12) United States Patent
Quadros et al.

(10) Patent No.: US 11,954,747 B2
(45) Date of Patent: *Apr. 9, 2024

(54) SYSTEMS AND METHODS FOR AUTOMATED DISTRIBUTION OF DIGITAL ASSETS

(71) Applicant: Capital One Services, LLC, McLean, VA (US)

(72) Inventors: Steven Quadros, New York, NY (US); Mykhaylo Bulgakov, Arlington, VA (US); Adnan Malik, Voorhees, NJ (US); Kevin P. Kelly, Austin, TX (US); William Carroll, Huntingtown, MD (US); Adam Vukich, Alexandria, VA (US); Abdelkader Benkreira, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/840,849

(22) Filed: Jun. 15, 2022

(65) Prior Publication Data

US 2022/0309600 A1   Sep. 29, 2022

Related U.S. Application Data

(63) Continuation of application No. 16/861,670, filed on Apr. 29, 2020, now Pat. No. 11,386,511.
(Continued)

(51) Int. Cl.
G06Q 50/00   (2012.01)
G06F 16/23   (2019.01)
(Continued)

(52) U.S. Cl.
CPC ....... *G06Q 50/186* (2013.01); *G06F 16/2379* (2019.01); *G06F 16/951* (2019.01);
(Continued)

(58) Field of Classification Search
CPC .... G06Q 40/02; G06Q 20/405; G06Q 50/186; G06Q 50/265; G06Q 20/3674;
(Continued)

(56) References Cited

U.S. PATENT DOCUMENTS 10,659,223 B2   5/2020   Wright et al.
2020/0294128 A1   9/2020   Cella

OTHER PUBLICATIONS

"Smart Contracts : The Blockchain Technology That Will Replace Lawyers," (https://blockgeeks.com/guides/smart-contracts/); 2016.

*Primary Examiner* — Scott S Trotter
(74) *Attorney, Agent, or Firm* — TROUTMAN PEPPER HAMILTON SANDERS LLP; Christopher J. Forstner; John A. Morrissett

(57) ABSTRACT

A method of distributing a smart will of a user, the method comprising: receiving a smart will creation request comprising: one or more beneficiary wallet identifiers, and asset distribution rules; creating, based on the smart will creation request, an estate smart contract, the estate smart contract being configured to authorize transfer of one or more assets registered to the estate smart contract to a storage location specified by an executor smart contract; receiving, by the executor smart contract, a death notification indicative of death of an owner of the estate smart contract; instructing the estate smart contract to transfer the assets from the estate smart contract to a trust smart contract; verifying, by the trust smart contract, that the beneficiary wallets are valid; and transferring, by the trust smart contract, one or more assets to the beneficiary wallets in accordance with the asset distribution rules.

20 Claims, 3 Drawing Sheets

Related U.S. Application Data

(60) Provisional application No. 62/842,223, filed on May 2, 2019.

(51) Int. Cl.
*G06F 16/951* (2019.01)
*G06Q 10/10* (2023.01)
*G06Q 20/36* (2012.01)
*G06Q 20/40* (2012.01)
*G06Q 40/02* (2023.01)
*G06Q 50/18* (2012.01)
*G06Q 50/26* (2012.01)

(52) U.S. Cl.
CPC ......... *G06Q 10/10* (2013.01); *G06Q 20/3674* (2013.01); *G06Q 20/405* (2013.01); *G06Q 40/02* (2013.01); *G06Q 50/265* (2013.01)

(58) Field of Classification Search
CPC ..... G06Q 10/10; G06F 16/23; G06F 16/2379; G06F 16/951
See application file for complete search history.

SYSTEMS AND METHODS FOR AUTOMATED DISTRIBUTION OF DIGITAL ASSETS

CROSS REFERENCE TO RELATED APPLICATIONS

This application is a continuation of, and claims priority under 35 U.S.C. § 120 to, U.S. patent application Ser. No. 16/861,670, filed Apr. 29, 2020, which issued as U.S. Pat. No. 11,386,511, which claims priority under 35 U.S.C. § 119 to U.S. Provisional Patent Application No. 62/842,223 filed May 2, 2019, the entire contents of which are fully incorporated herein by reference.

FIELD

The present disclosure relates to automated distribution of digital assets and, more specifically, to automated distribution of digital assets upon a decedent's passing.

BACKGROUND

Blockchain technology utilizes distributed ledgers to ensure the reliability of the transactions posted to the blockchain. By "mining" for new blocks, new transactions are recorded in the ledger and old transactions are further secured. The use of blockchains has enabled the use of crypto-currencies, as well as more-secure, distributed record systems. Blockchain wallets are repositories for goods and records stored on the blockchain. Blockchain wallets allow anyone with the corresponding key access to all goods stored therein. In other words, if a malicious third-party acquires a wallet's key, that third-party can remove all assets from the wallet. Because of the sensitive nature of the wallet's key, they are most commonly stored offline in, for example, a thumb drive. However, if an owner of a wallet dies, his heirs may be unable to recover the assets from the wallet. Additionally, if the key to a wallet is found after an owner dies, the finder could remove assets from the wallet without the assets being registered into the owner's estate. Furthermore, as additional assets (such as deeds, bank accounts, etc.) are moved to blockchain systems, such losses may only increase in kind and magnitude. To avoid this loss, owners may make copies of the keys, utilize storage managers, or write the keys down. However, such traditional methods are insecure, and can work against the purpose for private keys. Moreover, users risk losing or misplacing their private keys, especially as memory declines. Thus, traditionally, in order to maintain their private keys, users could ultimately compromise the underlying assets, exchanging one loss for another.

Accordingly, there is needed systems and methods for providing secure distribution of digital assets. Furthermore, provide secure distribution of block-chain based assets by automatically transferring assets upon an owner's death. Certain aspects of the present disclosure address these and other issues.

SUMMARY

According to some embodiments, there is provided a method of distributing electronic assets of a user, the method comprising: receiving a smart will creation request, the smart will creation request comprising: one or more beneficiary wallet identifiers, and asset distribution rules; creating, based on the smart will creation request, an estate smart contract, the estate smart contract being configured to authorize transfer of one or more assets registered to the estate smart contract to a storage location specified by an executor smart contract; receiving, by the executor smart contract and from a death oracle, a death notification indicative of death of an owner of the estate smart contract; instructing the estate smart contract to transfer the one or more assets from the estate smart contract to a trust smart contract; verifying, by the trust smart contract, that one or more beneficiary wallets corresponding to the one or more beneficiary wallet identifiers are valid; and transferring, by the trust smart contract, one or more assets to the one or more beneficiary wallets in accordance with the asset distribution rules.

The method may further include instantiating the trust smart contract in accordance with the asset distribution rules.

The trust smart contract may be instantiated by the executor smart contract in response to receiving the death notification.

The method may further include instantiating, by the trust smart contract, the one or more beneficiary wallets corresponding to the beneficiary wallet identifiers.

The method may further include delaying, by the trust smart contract, transfer of the one or more assets to the one or more beneficiary wallets until the death notification is confirmed.

The method may further include receiving, from a plurality of verifier smart contracts, a multi-signal verification of the death of the owner of the estate smart contract.

The death oracle comprises a web crawler of one or more publication obituary web pages.

The method may further include: receiving, from the estate smart contract, a request to change terms of the asset distribution rules; and updating the asset distribution rules in response to the request, wherein the trust smart contract transfers the one or more assets to the one or more beneficiary wallets in accordance with the updated asset distribution rules.

The method may further include: receiving, prior to transferring the one or more assets to the one or more beneficiary wallets, a recall of the death notification; and transferring, from the trust smart contract to the estate smart contract, the one or more assets to the estate smart contract.

According to some embodiments, there is provided a system including: a processor; and a memory having stored thereon computer program code that, when executed by the processor, controls the processor to: receive a smart will creation request, the smart will creation request comprising: one or more beneficiary wallet identifiers, and asset distribution rules; create, based on the smart will creation request, an estate smart contract, the estate smart contract being configured to authorize transfer of one or more assets registered to the estate smart contract to a storage location specified by an executor smart contract; receive, from a death oracle, a death notification indicative of death of an owner of the estate smart contract; instruct, via the executor smart contract, the estate smart contract to transfer the one or more assets from the estate smart contract to a trust smart contract; and configure the trust smart contract to transfer one or more assets to one or more beneficiary wallets corresponding to the one or more beneficiary wallet identifier in accordance with the asset distribution rules.

The computer program code, when executed by the processor, may further control the processor to instantiate the trust smart contract in accordance with the asset distribution rules.

The computer program code, when executed by the processor, may further control the processor to instantiate the trust smart contract in accordance with the asset distribution rules in response to receiving the death notification.

The computer program code, when executed by the processor, may further control the processor to configure the trust smart contract to delay transfer of the one or more assets to the one or more beneficiary wallets until the death notification is confirmed.

The computer program code, when executed by the processor, may further control the processor to: receive, from the estate smart contract, a request to change terms of the asset distribution rules; and update the asset distribution rules in response to the request, wherein the trust smart contract is configured to transfer the one or more assets to the one or more beneficiary wallets in accordance with the updated asset distribution rules.

The computer program code, when executed by the processor, may further control the processor to configure the trust smart contract to revert the one or more assets to the estate smart contract in response to a subsequent request from the estate smart contract.

According to some embodiments, there is provided a non-transitory computer readable medium having stored thereon computer program code that instructs a processor to perform a method including: receiving a smart will creation request, the smart will creation request comprising: one or more beneficiary wallet identifiers, and asset distribution rules; creating, based on the smart will creation request, an estate smart contract, the estate smart contract being configured to authorize transfer of one or more assets registered to the estate smart contract to a storage location specified by an executor smart contract; receiving, by the executor smart contract and from a death oracle, a death notification indicative of death of an owner of the estate smart contract; instructing the estate smart contract to transfer the one or more assets from the estate smart contract to a trust smart contract; and configured the trust smart contract to transfer one or more assets to one or more beneficiary wallets corresponding to the one or more beneficiary wallet identifiers in accordance with the asset distribution rules.

The method may further include instantiating the trust smart contract in accordance with the asset distribution rules.

The method may further include instantiating the trust smart contract in response to receiving the death notification.

The method may further include: receiving, from the estate smart contract, a request to change terms of the asset distribution rules; and updating the asset distribution rules in response to the request, wherein the trust smart contract transfers the one or more assets to the one or more beneficiary wallets in accordance with the updated asset distribution rules.

The method may further include configuring the trust smart contract to delay transfer of the one or more assets to the one or more beneficiary wallets until the death notification is confirmed.

BRIEF DESCRIPTION OF THE FIGURES

Implementations, features, and aspects of the disclosed technology are described in detail herein and are considered a part of the claimed disclosed technology. Other implementations, features, and aspects can be understood with reference to the following detailed description, accompanying drawings, and claims. Reference will now be made to the accompanying figures and flow diagrams, which are not necessarily drawn to scale.

DETAILED DESCRIPTION

According to some embodiments, smart contracts are utilized to provide automated distribution of digital assets within blockchain wallets. As one of ordinary skill will recognize in light of the present disclosure, smart contracts are self-executing, with the "terms of the agreement" written as lines of code, which may be embedded within or associated with one or more smart wallets. This code may exist across a distributed ledger network (e.g., a blockchain network). When conditions for the agreement are met, the code is carried out automatically, without the need for an external enforcement mechanism. A first smart contract is utilized as a blockchain wallet, creating an estate wallet. The estate wallet registers with a second smart contract acting as an executor agent, and registers the executor agent. As will be understood to one of ordinary skill in light of the present disclosure, the executor agent may be a smart wallet that exists on a same blockchain as the first smart contract, and can therefore transact with the estate wallet via the blockchain. The estate wallet sets the executor agent as a trusted address and is set-up to accept requests from the executor agent. Meanwhile, the executor agent registers the estate wallet as a managed account. If the owner of the smart wallet dies, the executor agent sends an instruction to the estate wallet to transfer the assets to a third smart contract acting as a trust wallet. The trust wallet distributes the assets to beneficiary wallets.

The executor agent may have one or more conditions for determining whether to initiate the asset transfer. For example, the executor agent may be triggered by an obituary of the owner published in certain publications, by a notice from government office, or some other source of information or authority regarding death pronouncements (e.g., a death oracle). In some cases, the obituary may initiate a timer (e.g., 30 days). After the timer expires, the assets are transferred to the trust wallet.

In certain embodiments, the executor agent instantiates the trust wallet based on instructions from the estate wallet. For example, the estate wallet may provide instructions for the distribution of the assets to the trust contract. In some implementations, the executor agent may transfer the assets to the trust wallet immediately upon receiving the indication from the death oracle. Meanwhile, the trust wallet may be configured to delay distribution of the assets (e.g., until a predetermined amount of time after the asset transfer). In some cases, the estate wallet may recover the assets from the trust wallet before the distribution if, for example, the death oracle prematurely triggered the transfer.

Aspects of the present disclosure will now be discussed in greater detail with reference to the figures.

Figure 1:
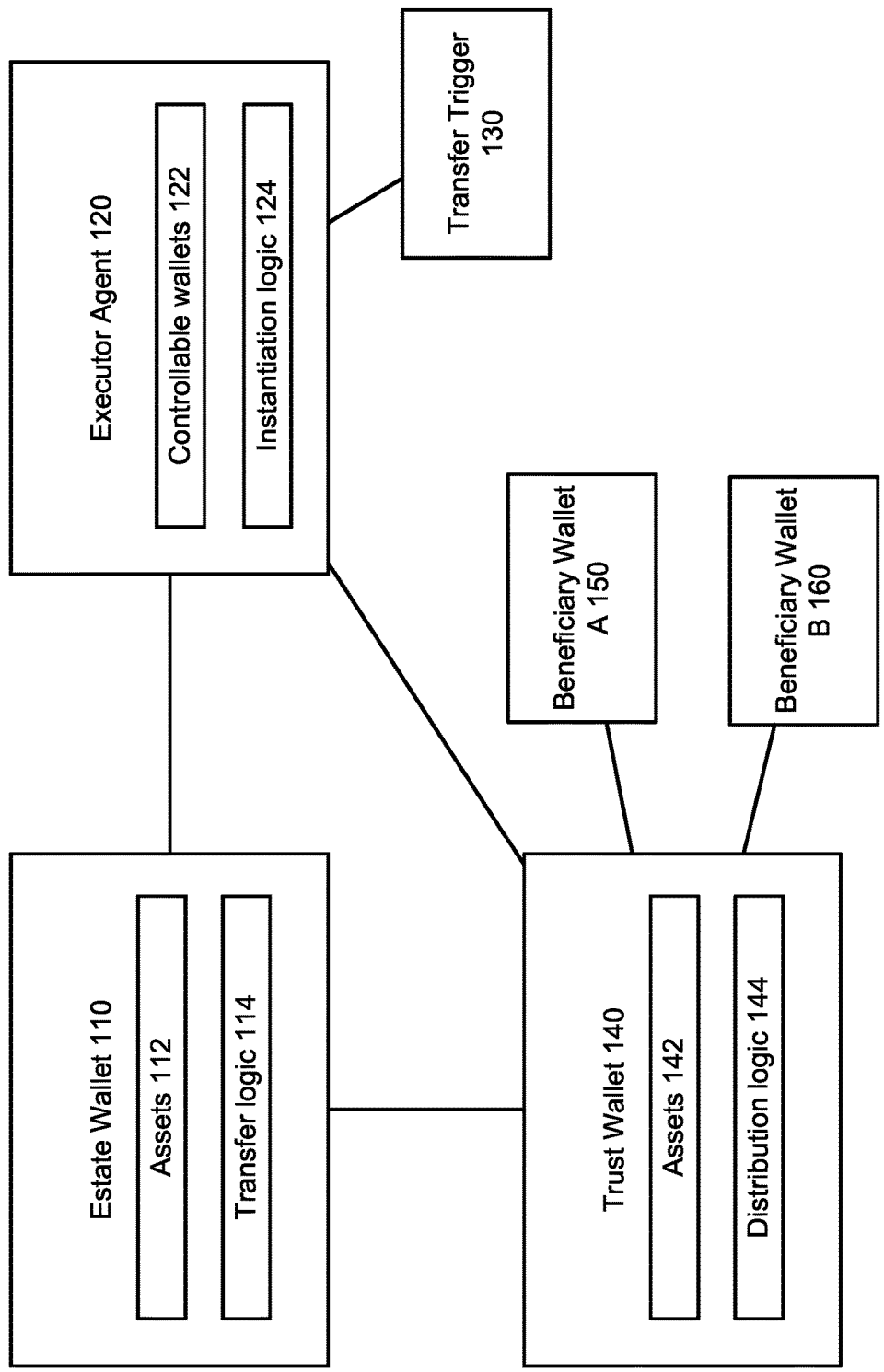
FIG. 1 illustrates an example environment in which certain aspects of the present disclosure may be implemented.

FIG. 1 illustrates an example environment 100 in which certain aspects of the present disclosure may be implemented. Environment 100 includes an estate wallet 110 (first smart contract), an executor agent 120 (second smart contract), transfer trigger 130 (e.g., a death oracle), a trust wallet 140 (third smart contract), and one or more beneficiary wallets 150 and 160. The estate wallet 110, executor agent 120, trust wallet 140, and beneficiary wallets 150 and 160 all reside on (e.g., have addresses on) the blockchain. Transfer trigger 130 may reside either on the blockchain, off the blockchain, or both on and off the blockchain depending on a specific implementation. For example, transfer trigger 130 may be a death oracle that interfaces with both the blockchain and external processes (e.g., non-blockchain network interface), providing an instruction when it detects an obituary of an owner of estate wallet 110 through, for example, an obituary monitor. The obituary monitor may be, for example, a crawler on obituary listings on one or more websites or by monitoring a file provided by one or more government agencies (e.g., the Death Master File available via the National Technical Information Service). In some cases, transfer trigger 130 may be a multi-signal trigger from a plurality of verifier smart contracts (e.g., associated with trusted third parties) that exist on a blockchain. In some instances, the death oracle may be triggered by a trusted (or master) node, for example, that is initiated when some external process (e.g., human verification) determines that the owner of estate wallet 110 has died.

Estate wallet 110 includes logic code (transfer logic 114) for instituting account distribution. Estate wallet 110 registers the executor agent 120 by storing its address as authorized to initiate the transfer logic 114. Registering the executor agent 120 may include estate wallet 110 executing a function within the executor agent 120, passing the estate wallet 110 address to the executor agent 120, and receiving the executor agent 120 address in response. In some cases, the transfer logic 114 includes an address for the trust wallet 140. In other cases, the executor agent 120 provides the address for the trust wallet 140 to the smart wallet. When the transfer logic 114 is activated, the assets 112 of estate wallet 110 are transferred to the assets 142 of the trust wallet 140.

Executor agent 120 includes a list of smart wallets 122 (e.g., smart wallet addresses) that it is authorized control over. Executor agent 120 may initiate the transfer logic 114 in estate wallet 110 to transfer the assets 112 to trust wallet 140, for example, by transmitting a transfer instruction to estate wallet 110. In some cases, recover agent 120 may include instantiation logic 124 for instantiating trust wallet 140 prior to initiating the transfer logic 114. The instantiation logic 124 may modify an existing code file (e.g., template) of a trust wallet to generate a case-specific trust wallet 140. As will be understood by one of ordinary skill in light of the present disclosure, the contents of the trust wallet 140 continue to be stored on the blockchain. In some cases, portions of the template may be unalterable (e.g., a trigger to return assets as discussed below in greater detail). When instantiating trust wallet 140, executor agent 120 may configure trust wallet 140 to transfer the assets 142 to beneficiary wallets 150 and 160 based on trust configurations received from estate wallet 110.

Trust wallet 140 may store the assets 142 received from estate wallet 110. Once instantiated, trust wallet 140 may transfer assets 142 to beneficiary wallets 142 in accordance with distribution logic 144. The distribution logic 142 may determine what beneficiary wallets receive which assets. In some cases, trust wallet 140 may delay transferring assets 142 to the beneficiary wallets 150 and 160. For example, trust wallet 140 may wait one-month after receiving assets from estate wallet 110 before the transfer. If estate wallet 110 requests a return of the assets prior to the one-month date, trust wallet 140 may transfer the assets 142 to estate wallet 110. Once all the assets 142 are transferred from the trust wallet 140 to the beneficiary wallets 142, trust wallet 140 may, in some cases, be deleted from the blockchain (e.g., the trust wallet 140 address may be deregistered from the blockchain). However, this is merely an example and, in some cases, trust wallet 140 may, in some cases, merely have no assets registered thereto, but may be used again in future smart-will processes and/or as a record of the asset distribution.

Figure 2:
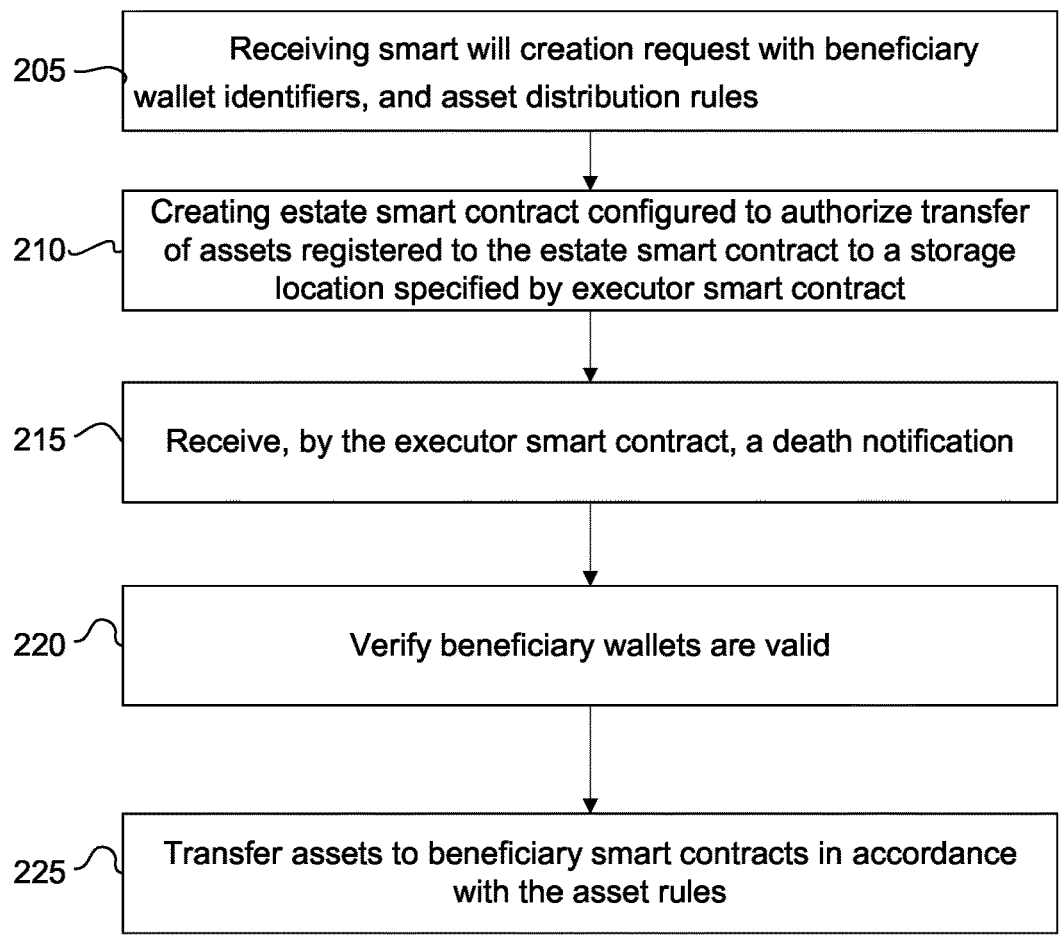
FIG. 2 is a flowchart of an asset transfer method according to an example embodiment.

FIG. 2 is a flowchart 200 of an asset transfer method according to an example embodiment according to an example embodiment. The method may be performed, for example, in the environment 100 of FIG. 1. The method of FIG. 2 may include receiving 205 a smart will creation request including one or more asset distribution rules. The method may further include creating 210 estate wallet 110 (e.g., an estate smart contract) based on the smart will creation request. Creating estate wallet 110 may include configuring estate wallet 110 to authorize transfer of one or more assets 112 registered to the estate wallet 110 to a storage location specified by executor agent 120 (e.g., an executor smart contract). For example, estate wallet 110 may include transfer logic 114 that executes a routine for transferring assets 112 out of estate wallet 110. The transfer logic 114 may be configured to accept initiation from executor agent 120 (e.g., from the executor agent 120 address). As an example, executor agent 120 may receive a smart will creation request and create estate wallet 110 based thereon. In some cases, the smart will creation request may further identify one or more beneficiary smart wallets and/or future smart wallets (if to be subsequently instantiated) to ultimately receive the assets 112.

Subsequently, executor agent 120 may receive 215 a death notification of an owner of estate wallet 110, e.g., from transfer trigger 130. For instance, executor agent 120 may subscribe to a death oracle that monitors obituaries and/or official death databases to identify a death of the owner. As non-limiting examples, the death oracle may operate as a web crawler of one or more obituary websites. The smart will creation request may include identification information of the owner of the estate wallet that are commonly included in death announcements and records (e.g., name, birthdate, place of birth and residence). In some cases, the death oracle may eb maintained by a trusted entity, that confirms a death of the owner using external processes (e.g., next of kin, review of death certificates, etc.).

Executor agent 120 then instructs 220 estate wallet 110 to transfer ownership of the assets 112 from estate wallet 110 to trust wallet 140. (e.g., a trust smart contract). In some cases, executor agent 120 may instantiate trust wallet 130 based on the asset distribution rules. Executor agent 120 may instantiate trust wallet 130 in response to receiving 215 the death notification.

Then, the beneficiary wallets 150 and 160 are verified 220 to be valid and the assets 142 are transferred from the trust wallet 140 to the beneficiary wallets 150 and 160 in accordance with the asset distribution rules. For example, the asset distribution rules may be embedded within trust wallet 140 (e.g., in distribution logic 144). Trust wallet 140 may verify 220 beneficiary wallets 150 and 160, for example, by validating the addresses of beneficiary wallets 150 and '160 (e.g., by making calls to beneficiary wallets 150 and 160 that resolve) and/or validating access to beneficiary wallets 150 and 160. In some cases, verifying 220 beneficiary wallets 150 and 160 may include requiring the owner(s) of beneficiary wallets 150 and 160 to institute transaction(s) with trust wallet 140. In certain implementations, the transaction(s) must include "secret" information to verify ownership (e.g., included as a message or unique code in a text field of the transaction). In a case where the verifying 220 one or more of the beneficiary wallets 150 and 160 fails, the assets may be held until resolved outside of the blockchain (e.g., through a legal process) or disperse assets to verified 220 beneficiary wallets.

In some cases, trust wallet 140 and/or executor agent 120 may instantiate the beneficiary wallets 150 and 160 in accordance with the smart will creation request. In certain implementations, beneficiary wallets will be pre-created and identified by the smart will creation request.

According to some implementations, trust wallet 140 may delay transfer of the assets 142 to beneficiary wallets 150 and 160 until the death notification is confirmed. For example, a plurality of trusted third-party smart contracts must verify the death notification (e.g., multi-signal verification of the death and/or through polling an official death registry (e.g., the Death Master File available via the National Technical Information Service). The trusted third-party smart contracts may be identified in advance by the asset distribution rules.

In some cases, executor agent 120 may receive (e.g., from estate wallet 110) a request to change terms of the asset distribution rules. For example, based on changes to the assets 112 stored in estate wallet 110 or changed familial circumstances, the owner of estate wallet 110 may prefer to alter the distribution of assets to the beneficiary wallets 150 and 160. Accordingly, executor agent 120 may update the asset distribution rules in response to the request. In cases where executor agent 120 instantiates trust wallet 140 after receiving the death notification, this process of updating the asset distribution rules and distributing distribution functions (between the estate wallet 110, executor agent 120, and trust wallet 140) lessens computer overhead and processor requirements by limiting creation of unnecessary smart contracts.

Changing the asset distribution rules may require ID verification of the owner of estate contract 110. The verification may merely require use of the private key to access the estate contract 110. In certain implementations, changing the asset distribution rules may require an authorization signal from outside of the estate contract 110, such as from executor agent 120, indicating that the owner of estate contract 110 which to make changes (e.g., in addition to ownership of the estate contract 110 private key). In some cases, changing the asset distributions may require writing a new estate contract 110 containing the amended asset distribution rules. In other instances, changing the asset distributions may include make addendums to the exists estate contract 110.

Trust wallet 140 may receive an indication that the death notification is invalid. For example, trust wallet 140 may receive a recall of the death notification from executor agent 120. Alternatively, estate wallet 110 may transmit a request to revert control of assets 142 to the estate wallet 110. In such cases, trust wallet 140 may transfer the assets 142 back to estate wallet 110. However, such a return of assets is only practicable in cases where the assets 142 have not been transferred to beneficiary wallets 150 and 160. Accordingly, in some cases, trust wallet 140 may be configured to hold assets 142 for a determinable time (e.g., a preset time length such as 30 days, a time established in accordance with the asset distribution rules, and/or held until some condition is met) before transferring assets 142 to beneficiary wallets 150 and 160. Such delay may be included within the smart will creation request and stored in trust wallet 140 (e.g., in distribution logic 144). In some instances, trust wallet 140 may transfer the assets to a wallet controlled by a trusted third-party (e.g., a bank of custodian) who then transfers the assets to beneficiary wallets 150 and 160. When trust wallet 140 transfers the assets to the wallet controlled by the trusted third-party it may include instructions as to individuals (and/or wallets) that are to receive specific assets. Moreover, such a transfer may help facilitate, for example, paying taxes on the assets, reporting (e.g., governmental or IRS reporting), and/or resolving any beneficiary wallet 150 and 160 issues.

Figure 3:
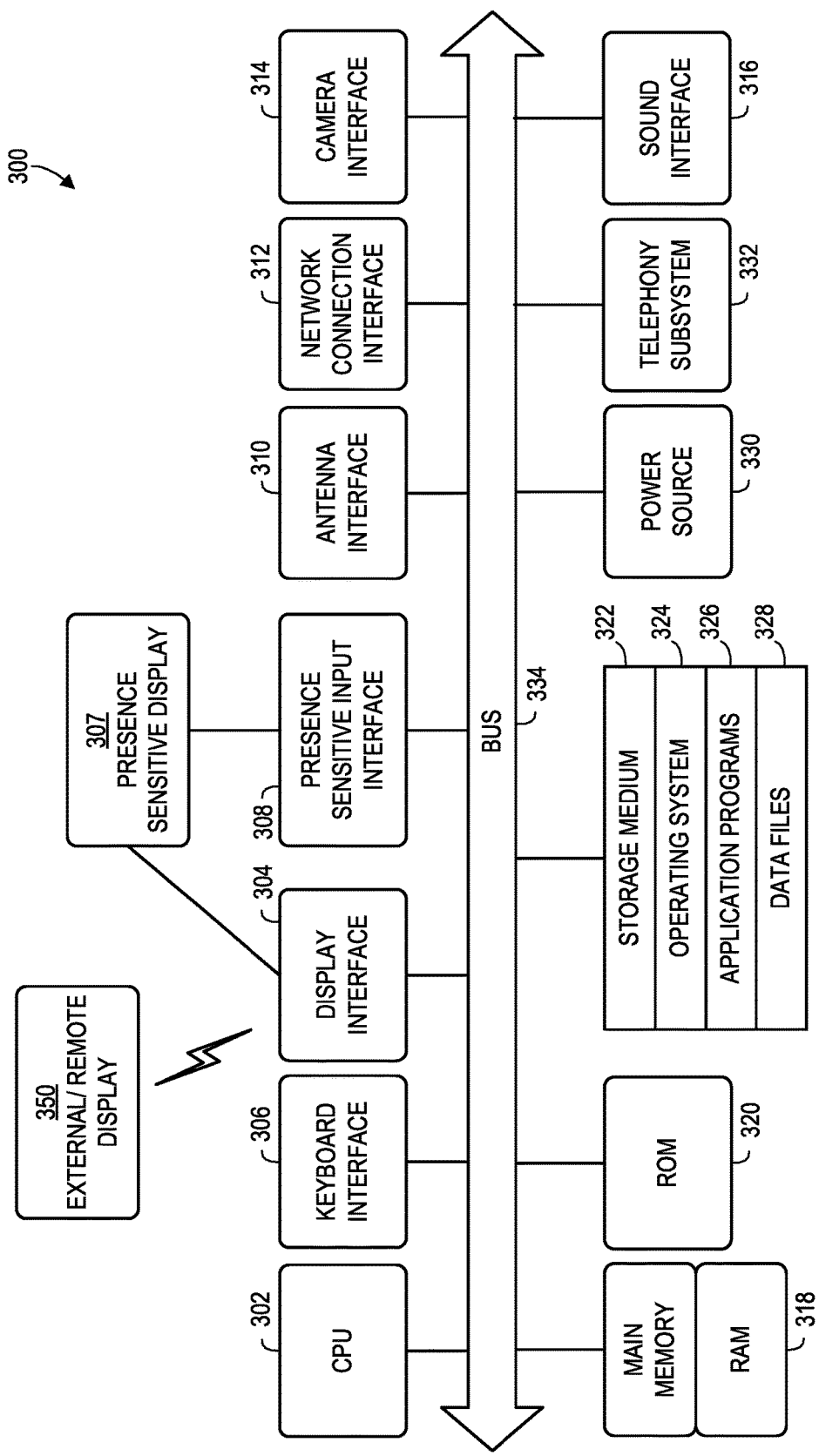
FIG. 3 is a computer architecture diagram according to an example embodiment.

Aspects of the disclosed technology may be implementing using at least some of the components illustrated in the computing device architecture 300 of FIG. 3. As shown, the computing device architecture includes a central processing unit (CPU) 302, where computer instructions are processed; a display interface 304 that acts as a communication interface and provides functions for rendering video, graphics, images, and texts on the display. In certain example implementations of the disclosed technology, the display interface 304 may be directly connected to a local display, such as a touch-screen display associated with a mobile computing device. In another example implementation, the display interface 304 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 304 may wirelessly communicate, for example, via a Wi-Fi channel or other available network connection interface 312 to the external/remote display.

In an example implementation, the network connection interface 312 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 304 may be operatively coupled to a local display, such as a touch-screen display associated with a mobile device. In another example, the display interface 304 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 304 may wirelessly communicate, for example, via the network connection interface 312 such as a Wi-Fi transceiver to the external/remote display.

The computing device architecture 300 may include a keyboard interface 306 that provides a communication interface to a keyboard. In one example implementation, the computing device architecture 300 may include a presence-sensitive display interface 308 for connecting to a presence-sensitive display 307. According to certain example implementations of the disclosed technology, the presence-sensitive display interface 308 may provide a communication interface to various devices such as a pointing device, a touch screen, a depth camera, etc. which may or may not be associated with a display.

The computing device architecture 300 may be configured to use an input device via one or more of input/output interfaces (for example, the keyboard interface 306, the display interface 304, the presence sensitive display interface 308, network connection interface 312, camera interface 314, sound interface 316, etc.) to allow a user to capture information into the computing device architecture 300. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 300 or may be a separate device. For example, the input device may be an accelerometer, a magnetometer, a digital camera, a microphone, and an optical sensor.

Example implementations of the computing device architecture 300 may include an antenna interface 310 that provides a communication interface to an antenna; a network connection interface 312 that provides a communication interface to a network. As mentioned above, the display interface 304 may be in communication with the network connection interface 312, for example, to provide information for display on a remote display that is not directly connected or attached to the system. In certain implementations, a camera interface 314 is provided that acts as a communication interface and provides functions for capturing digital images from a camera. In certain implementations, a sound interface 316 is provided as a communication interface for converting sound into electrical signals using a microphone and for converting electrical signals into sound using a speaker. According to example implementations, a random-access memory (RAM) 318 is provided, where computer instructions and data may be stored in a volatile memory device for processing by the CPU 302.

According to an example implementation, the computing device architecture 300 includes a read-only memory (ROM) 320 where invariant low-level system code or data for basic system functions such as basic input and output (I/O), startup, or reception of keystrokes from a keyboard are stored in a non-volatile memory device. According to an example implementation, the computing device architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an example implementation, the computing device architecture 300 includes a power source 330 that provides an appropriate alternating current (AC) or direct current (DC) to power components.

According to an example implementation, the computing device architecture 300 includes and a telephony subsystem 332 that allows the device 300 to transmit and receive sound over a telephone network. The constituent devices and the CPU 302 communicate with each other over a bus 334.

According to an example implementation, the CPU 302 has appropriate structure to be a computer processor. In one arrangement, the CPU 302 may include more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data may be stored in the RAM 318, where the data may be accessed by the computer CPU 302 during execution. In one example configuration, the device architecture 300 includes at least 38 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 322, which may comprise a machine-readable storage medium.

According to one example implementation, the term computing device, as used herein, may be a CPU, or conceptualized as a CPU (for example, the CPU 302 of FIG. 3). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An embodiment of the present disclosure may be implemented according to at least the following:

Clause 1: A method of distributing a smart will assets, the method comprising: receiving a smart will creation request, the smart will creation request comprising: one or more beneficiary wallet identifiers, and asset distribution rules; creating, based on the smart will creation request, an estate smart contract, the estate smart contract being configured to authorize transfer of one or more assets registered to the estate smart contract to a storage location specified by an executor smart contract; receiving, by the executor smart contract and from a death oracle, a death notification indicative of death of an owner of the estate smart contract; instructing the estate smart contract to transfer the assets from the estate smart contract to a trust smart contract; verifying, by the trust smart contract, that the beneficiary wallets are valid; and transferring, by the trust smart contract, one or more assets to the beneficiary wallets in accordance with the asset distribution rules.

Clause 2: The method of clause 1 further comprising instantiating the trust smart contract in accordance with the asset distribution rules.

Clause 3: The method of clauses 1 or 2, wherein the trust smart contract is instantiated by the executor smart contract in response to receiving the death notification.

Clause 4: The method of any of clauses 1-3 further comprising instantiating, by the trust smart contract, one or more beneficiary wallets corresponding to the beneficiary wallet identifiers.

Clause 5: The method of any of clauses 1-4 further comprising delaying, by the trust smart contract, transfer of the assets to the beneficiary wallets until the death notification is confirmed.

Clause 6: The method of any of clauses 1-5 further comprising receiving, from a plurality of verifier smart contracts, a multi-signal verification of the death.

Clause 7: The method of any of clauses 1-6, wherein the death oracle comprises a web crawler of one or more publication obituary web pages.

Clause 8: The method of any of clauses 1-7 further comprising: receiving, from the estate smart contract, a request to change terms of the asset distribution rules; and updating the asset distribution rules in response to the request, wherein the trust smart contract transfers the one or more assets to the beneficiary wallets in accordance with the updated asset distribution rules.

Clause 9: The method of any of clauses 1-8 further comprising: receiving, prior to transferring the one or more assets to the beneficiary wallets, a recall of the death notification; and transferring, from the trust smart contract to the estate smart contract, the one or more assets to the estate smart contract.

Clause 10. A system comprising: a processor; and a memory having stored thereon computer program code that, when executed by the processor, controls the processor to: receive a smart will creation request, the smart will creation request comprising: one or more beneficiary wallet identifiers, and asset distribution rules; create, based on the smart will creation request, an estate smart contract, the estate smart contract being configured to authorize transfer of one or more assets registered to the estate smart contract to a storage location specified by an executor smart contract; receive, from a death oracle, a death notification indicative of death of an owner of the estate smart contract; instruct, via the executor smart contract, the estate smart contract to transfer the assets from the estate smart contract to a trust smart contract; and configure the trust smart contract to transfer one or more assets to the beneficiary wallets in accordance with the asset distribution rules.

Clause 11: The system of clause 10, wherein the computer program code, when executed by the processor, further controls the processor to instantiate the trust smart contract in accordance with the asset distribution rules.

Clause 12: The system of clauses 10 or 11, wherein the computer program code, when executed by the processor, further controls the processor to instantiate the trust smart contract in accordance with the asset distribution rules in response to receiving the death notification.

Clause 13: The system of any of clauses 10-12, wherein the computer program code, when executed by the processor, further controls the processor to configure the trust smart contract to delay transfer of the assets to the beneficiary wallets until the death notification is confirmed.

Clause 14: The system of any of clauses 10-13, wherein the computer program code, when executed by the processor, further controls the processor to: receive, from the estate smart contract, a request to change terms of the asset distribution rules; and update the asset distribution rules in response to the request, wherein the trust smart contract is configured to transfer the one or more assets to the beneficiary wallets in accordance with the updated asset distribution rules.

Clause 15: The system of any of clauses 10-14, wherein the computer program code, when executed by the processor, further controls the processor to configure the trust smart contract to revert the assets to the estate smart contract in response to a subsequent request from the estate smart contract.

Clause 16: A non-transitory computer readable medium having stored thereon computer program code that instructs a processor to perform a method comprising: receiving a smart will creation request, the smart will creation request comprising: one or more beneficiary wallet identifiers, and asset distribution rules; creating, based on the smart will creation request, an estate smart contract, the estate smart contract being configured to authorize transfer of one or more assets registered to the estate smart contract to a storage location specified by an executor smart contract; receiving, by the executor smart contract and from a death oracle, a death notification indicative of death of an owner of the estate smart contract; instructing the estate smart contract to transfer the assets from the estate smart contract to a trust smart contract; and configured the trust smart contract to transfer one or more assets to the beneficiary wallets in accordance with the asset distribution rules.

Clause 17: The non-transitory computer readable medium of clause 16, wherein the method further comprises instantiating the trust smart contract in accordance with the asset distribution rules.

Clause 18: The non-transitory computer readable medium of clause 16 or 17, wherein the method further comprises instantiating the trust smart contract in response to receiving the death notification.

Clause 19: The non-transitory computer readable medium of any of clauses 16-18, wherein the method further comprises: receiving, from the estate smart contract, a request to change terms of the asset distribution rules; and updating the asset distribution rules in response to the request, wherein the trust smart contract transfers the one or more assets to the beneficiary wallets in accordance with the updated asset distribution rules.

Clause 20: The non-transitory computer readable medium of any of clauses 16-19, wherein the method further comprises configuring the trust smart contract to delay transfer of the assets to the beneficiary wallets until the death notification is confirmed.

Clause 21: A non-transitory computer readable medium having stored thereon computer program code that instructs a processor to perform a method of any of clauses 1-9.

Example Use Case

The following example use case describes an example of a use of systems and methods for automated asset distribution. The example use case is intended solely for explanatory purposes and not for limitation. In an embodiment, an individual wants to ensure his digital assets are properly distributed at his death. He submits a smart will creation request that includes an identification of his assets, their current locations, asset distribution rules, and/or beneficiary identities. An estate smart contract is created that includes transfer logic that can be initiated by an executor agent to transfer the assets from the estate smart contract. Upon the individual's death, a death oracle monitoring government databases of official death records notifies the executor agent of the death. The executor agent instantiates a trust smart contract and instructs the estate smart contract to send its assets to the trust smart contract. The trust smart contract then transfers the assets to beneficiaries (e.g., beneficiary digital wallets) based on the asset distribution rules.

What is claimed is:

1. A method comprising:
creating an estate smart contract configured to authorize transfer of one or more assets registered to the estate smart contract by an executor smart contract,
wherein the estate smart contract corresponds to a first address on a first blockchain; and
wherein the executor smart contract corresponds to a second address on the first blockchain;
receiving, by the executor smart contract via a transfer trigger, a death notification indicative of death of an owner of the estate smart contract, wherein the transfer trigger corresponds to a third address outside of the first blockchain;
authorizing, by the estate smart contract and based on the second address being registered with a trust smart contract, the executor smart contract to transfer the one or more assets to the trust smart contract, wherein the trust smart contract corresponds to a fourth address on the first blockchain;
verifying, by the trust smart contract, whether one or more beneficiary wallets corresponding to the estate smart contract are valid; and
responsive to verifying that the one or more beneficiary wallets are valid, transferring, by the trust smart contract, the one or more assets to the one or more beneficiary wallets.

2. The method of claim 1, further comprising:
receiving a smart will creation request, the smart will creation request comprising:
one or more beneficiary wallet identifiers, and
one or more asset distribution rules,
wherein creating the estate smart contract is based on receiving the smart will creation request.

3. The method of claim 2, further comprising:
instantiating the trust smart contract in accordance with the one or more asset distribution rules,
wherein the trust smart contract is instantiated by the executor smart contract in response to receiving the death notification.

4. The method of claim 2, further comprising:
instantiating, by the trust smart contract, the one or more beneficiary wallets corresponding to the beneficiary wallet identifiers.

5. The method of claim 2, further comprising:
receiving, from the estate smart contract, a request to change terms of the one or more asset distribution rules; and
updating the one or more asset distribution rules in response to the request, wherein the trust smart contract transfers the one or more assets to the one or more beneficiary wallets in accordance with the updated one or more asset distribution rules.

6. The method of claim 1, further comprising:
receiving, by the estate smart contract, the second address of the executor smart contract; and
registering, by the estate smart contract, the second address with the trust smart contract.

7. The method of claim 1, further comprising:
delaying, by the trust smart contract, transfer of the one or more assets to the one or more beneficiary wallets until the death notification is confirmed.

8. The method of claim 1, wherein the death notification is provided by a death oracle that comprises a web crawler of one or more publication obituary web pages.

9. The method of claim 1, further comprising:
receiving, prior to transferring the one or more assets to the one or more beneficiary wallets, a recall of the death notification; and
transferring, from the trust smart contract to the estate smart contract, the one or more assets to the estate smart contract.

10. A system, comprising:
one or more processors; and a memory in communication with the one or more processors and storing instructions that, when executed by the one or more processors, are configured to cause the system to:
  create an estate smart contract configured to authorize transfer of one or more assets registered to the estate smart contract by an executor smart contract,
    wherein the estate smart contract corresponds to a first address on a first blockchain; and
    wherein the executor smart contract corresponds to a second address on the first blockchain;
  receive, by the executor smart contract via a transfer trigger, a death notification indicative of death of an owner of the estate smart contract, wherein the transfer trigger corresponds to a third address outside of the first blockchain;
  authorize, by the estate smart contract and based on the second address being registered with a trust smart contract, the executor smart contract to transfer the one or more assets to the trust smart contract, wherein the trust smart contract corresponds to a fourth address on the first blockchain;
  verify, by the trust smart contract, whether one or more beneficiary wallets corresponding to the estate smart contract are valid; and
  responsive to verifying that the one or more beneficiary wallets are valid, transfer, by the trust smart contract, the one or more assets to the one or more beneficiary wallets.

11. The system of claim 10, wherein the instructions are further configured to cause the system to:
  receive a smart will creation request, the smart will creation request comprising:
    one or more beneficiary wallet identifiers, and
    one or more asset distribution rules,
      wherein creating the estate smart contract is based on receiving the smart will creation request.

12. The system of claim 11, wherein the instructions are further configured to cause the system to:
  instantiate the trust smart contract in accordance with the one or more asset distribution rules,
    wherein the trust smart contract is instantiated by the executor smart contract in response to receiving the death notification.

13. The system of claim 11, wherein the instructions are further configured to cause the system to:
  receive, from the estate smart contract, a request to change terms of the one or more asset distribution rules; and
  update the one or more asset distribution rules in response to the request, wherein the trust smart contract transfers the one or more assets to the one or more beneficiary wallets in accordance with the updated one or more asset distribution rules.

14. The system of claim 10, wherein the instructions are further configured to cause the system to:
  receive, by the estate smart contract, the second address of the executor smart contract; and
  register, by the estate smart contract, the second address with the trust smart contract.

15. The system of claim 10, wherein the instructions are further configured to cause the system to:
  delay, by the trust smart contract, transfer of the one or more assets to the one or more beneficiary wallets until the death notification is confirmed.

16. The system of claim 10, wherein receiving the death notification comprises analyzing a change to a government-maintained death master file.

17. The system of claim 10, wherein the instructions are further configured to cause the system to:
  receive, prior to transferring the one or more assets to the one or more beneficiary wallets, a recall of the death notification; and
  transfer, from the trust smart contract to the estate smart contract, the one or more assets to the estate smart contract.

18. A system, comprising:
  one or more processors; and
  a memory in communication with the one or more processors and storing instructions that, when executed by the one or more processors, are configured to cause the system to:
    create an estate smart contract configured to authorize transfer of one or more assets by an executor smart contract,
      wherein the estate smart contract corresponds to a first address on a first blockchain; and
      wherein the executor smart contract corresponds to a second address on the first blockchain;
    receive, by the executor smart contract via a transfer trigger, a death notification indicative of death of an owner of the estate smart contract, wherein the transfer trigger corresponds to a third address on the first blockchain;
    authorize, by the estate smart contract, the executor smart contract to transfer the one or more assets to a trust smart contract, wherein the trust smart contract corresponds to a fourth address on the first blockchain;
    verify, by the trust smart contract, whether one or more beneficiary wallets corresponding to the estate smart contract are valid; and
    responsive to verifying that the one or more beneficiary wallets are valid, transfer, by the trust smart contract, the one or more assets to the one or more beneficiary wallets.

19. The system of claim 18, wherein the instructions are further configured to cause the system to:
  receive a smart will creation request, the smart will creation request comprising:
    one or more beneficiary wallet identifiers, and
    one or more asset distribution rules,
      wherein creating the estate smart contract is based on receiving the smart will creation request.

20. The system of claim 19, wherein the instructions are further configured to cause the system to:
  receive, from the estate smart contract, a request to change terms of the one or more asset distribution rules; and
  update the one or more asset distribution rules in response to the request, wherein the trust smart contract transfers the one or more assets to the one or more beneficiary wallets in accordance with the updated one or more asset distribution rules.

* * * * *